United States Patent [19]

Davis

[11] Patent Number: 4,488,647
[45] Date of Patent: Dec. 18, 1984

[54] FLEXIBLE PACKAGE WITH EASY OPENING PEEL SEAL

[75] Inventor: John S. Davis, New Hope, Pa.

[73] Assignee: Paramount Packaging Corporation, Chalfont, Pa.

[21] Appl. No.: 514,575

[22] Filed: Jul. 18, 1983

[51] Int. Cl.³ .............................................. B65D 77/12
[52] U.S. Cl. ................................ 206/525; 206/524.8; 206/631; 206/459; 229/48 T; 383/89
[58] Field of Search ............... 206/525, 484, 438, 439, 206/524.8, 807, 631, 459; 228/48 T; 383/89

[56] References Cited

U.S. PATENT DOCUMENTS

| | | |
|---|---|---|
| 3,192,091 | 6/1965 | Hey et al. ........................... 206/484 |
| 3,278,109 | 10/1966 | Salway ............................... 206/462 |
| 3,491,935 | 1/1970 | Trotter, Jr. et al. ............. 229/3.5 R |
| 3,533,548 | 10/1970 | Taterka ............................... 206/438 |
| 3,551,436 | 5/1970 | Kessler . |
| 3,551,746 | 5/1970 | Davies . |
| 3,552,638 | 1/1971 | Quackenbush ................... 229/3.5 R |
| 3,595,468 | 7/1971 | Repko . |
| 4,097,236 | 6/1978 | Daly et al. .......................... 206/459 |
| 4,183,434 | 1/1980 | Watt ..................................... 206/631 |
| 4,197,947 | 4/1980 | Zaidi .................................... 206/807 |
| 4,252,846 | 2/1981 | Romesberg et al. ................ 206/631 |
| 4,264,392 | 4/1981 | Watt ..................................... 206/631 |
| 4,279,344 | 7/1981 | Holloway, Jr. ...................... 206/631 |
| 4,361,237 | 11/1982 | Heiremans et al. ................ 206/631 |
| 4,365,716 | 12/1982 | Watt ..................................... 206/632 |

Primary Examiner—William T. Dixson, Jr.
Attorney, Agent, or Firm—Robert C. Podwil

[57] ABSTRACT

A package made of a flexible laminate has a heat-fusible seal of a strength sufficient to retain vacuum within the package and to withstand handling, but capable of being broken by hand manipulation.

12 Claims, 7 Drawing Figures

FLEXIBLE PACKAGE WITH EASY OPENING PEEL SEAL

BACKGROUND OF THE INVENTION

This invention relates to packages made from flexible film material, and more particularly, to packages made from such material and having an opening sealed by a novel non-resealable (by hand) "peelable" seal. In general, this invention relates to bag-like packages of kinds suitable for coffee or other products which require gas or moisture protection, but which permit ready access to their contents through an opening having a peelable seal.

Certain products, such as coffee, have heretofore been marketed in flexible packages, so-called "soft packs". One such package consists of a bag constructed from a laminated film material of three or four plies, which provides physical containment for the product as well as a moisture and gas barrier. Various film materials have been used, but typically they include one or more plies of materials which provide a desired physical strength and dimensional stability, a ply which can be printed upon to provide for the package lebeling and other markings, and a ply which provides a gas or moisture barrier.

For some applications, it is the practice to construct the package or bag by heat sealing the laminated material to form a bag or receptacle. The package may then be filled, and its opening heat sealed closed to produce a unit ready for shipping. Packages or bags of the above description may be used in vacuum packing, a familiar technique in which the contents are exposed to a reduced atmosphere during the sealing operation to draw off air (which may contribute to spoilage) or to eliminate gases which might otherwise evolve or diffuse out of the product over time. The present invention may be used, however, to equal advantage, with vacuum, non-vacuum or gas-flushed packages.

The seals for packages of the above-described type must of course be strong enough to withstand routine handling and foreseeable mishandling, and to avoid spillage due to failure of the closure. Also, the closure must be strong enough and permanent enough to resist tampering. In typical prior art packages, the seals are often as strong as the other seams of the package. Opening may require the use of knives, scissors or other cutting instruments. As an alternative, schemes have been proposed for the use of frangible elements, tear strips or drawstrings, to facilitate opening. Each of these in some measure complicates the production process, and results in partial or complete destruction of the package upon opening. This latter attribute is itself undesirable, for in the marketing of certain products, it is common to open the package, process the contents (as, for example, in the grinding of coffee beans), and return the processed contents to the package.

The present invention provides a flexible package which features an easy opening peel seal which can be manufactured in a variety of strengths, and which, unlike known previously existing peel seals is sufficiently strong to meet all of the usual requirements, including the ability to reliably retain vacuum. Another aspect of the novel peel seal of the present package is extreme simplicity of manufacture, in which the making of the seal lends itself to continuous processes of the kinds used to make and fill packages. Yet another object and advantage of the present invention is its provision of a seal whose integrity may be inspected and verified virtually at a glance, because separated or failed parts of the seal take on a distinctive appearance.

BRIEF DESCRIPTION OF THE INVENTION

The foregoing and other objects of the present invention are realized, in a presently preferred form of the invention, by a package which comprises a bag-like body member having side and bottom walls in which the body member is formed of a flexible laminate having a ply capable of carrying printing, a barrier ply to which the exterior ply is laminated, and a sealing ply which forms the inner surface of the body member. The body member has an opening, or mouth portion, and a hand-peelable seal is provided for the mouth portion, the seal comprising a heat-fuseable plastic polymeric coating so arranged as to have, when the package is sealed, strength sufficient to retain vacuum within the package and to withstand the stresses attendant handling and shipping, yet capable of being opened by hand manipulation. The seal, in the presently preferred form of the invention, consists of ethylene vinyl acetate, with an additive of magnesium silicate in certain proportions.

There are shown in the drawings by way of illustration certain presently preferred embodiments of the invention, but it should be understood that the invention is not limited to the precise arrangements and instrumentalities shown.

DETAILED DESCRIPTION

Figure 1:
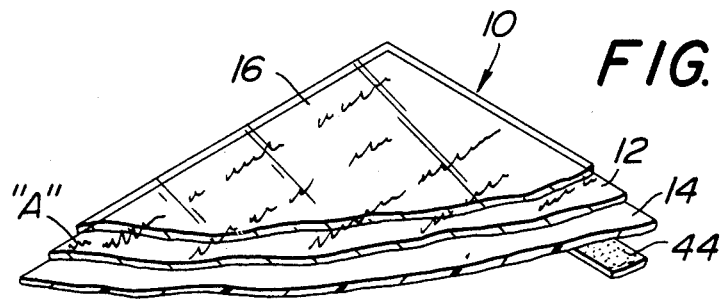
FIG. 1 is a perspective view of a portion of a laminated web which may be used in conjunction with the present invention.

Packages in accordance with the present invention are made from flexible material, conventionally of laminated construction. Referring now to the drawings in detail, wherein like reference numerals indicate like elements, there in seen in FIG. 1 a laminate designated generally by the reference numeral 10. The laminate 10 is a three-layered laminate of a kind which may be used in flexible packaging generally, and is particularly well-suited to use in the present invention. The laminate 10 consists of a layer, or ply 12, of PVDC coated cellophane or like material laminated in a conventional manner to a polyethylene layer, or ply, 14. The layer 12 provides a middle, or barrier ply, while the layer 14 provides an inner, or sealing ply, of the package ultimately to be made from the laminate 10. The middle layer, or ply, 12 may be printed upon by conventional gravure processes, preferably in multicolors, to provide packaging and labeling information. A third layer, or ply, 16, which forms the exterior layer of the package to be made from the laminate 10, may be applied over the printed face of the layer 12 to protect the printed matter. The layer 16, in the preferred form of the laminate 10, is of a clear material such as polyester, so that the printed matter "A" on the middle layer 12 remains clearly visible through it.

Figure 2:
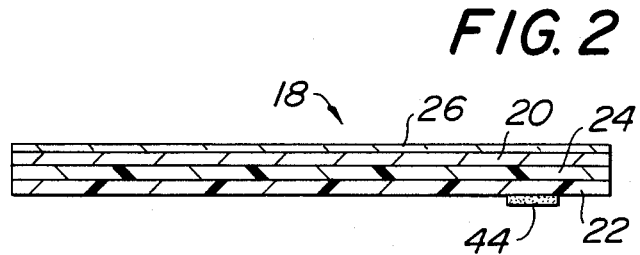
FIG. 2 is a cross-sectional view of another laminate which may be used in conjunction with the present invention.

The laminate which is illustrated in FIG. 2, which is designated generally by the reference numeral 18, has a four-ply structure which consists of an aluminum foil layer, or poly, 20, a polyethylene inner layer or ply, 22 or nylon intermediate layer, or ply, 24, and a clear polyester outer layer, or ply 26. In manufacturing the laminate 18, the aluminum foil layer 20, nylon layer 24 and polyethylene layer 22 are first laminated into a single web structure. Printing may be applied to the foil layer 20, using conventional multicolor gravure or other techniques, and the polyester layer 26, like the above-described layer 16, may be applied in the above manner to complete the laminate.

The particular materials selected for the various layers will of course be determined by the ultimate application intended for the package. Equivalent materials other than those specifically mentioned above may be used.

Figure 3:
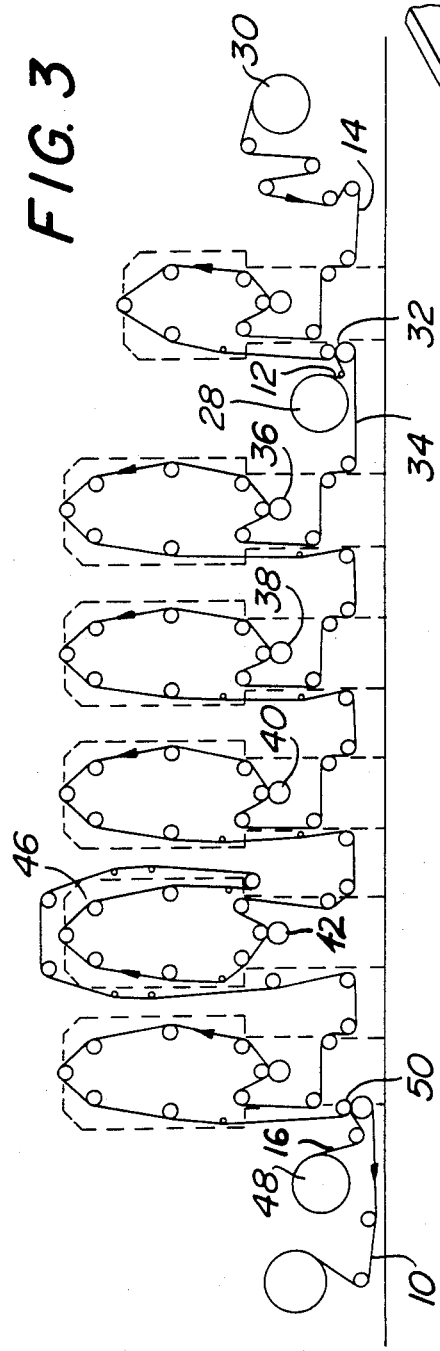
FIG. 3 is a diagramatic view, showing a series of steps which may be used to produce a laminate for use in packages in accordance with the invention.

Referring now to FIG. 3, the manner in which laminates may be made, with provision for the present unique peelable seal, will be described. Although FIG. 3 has specific reference to the above-described laminate 10, modifications appropriate to use of the laminate 18 or other suitable laminates will be self-evident.

Supply rolls 28 and 30 provide webs of material for the middle layer 12 and inner layer 14, the webs passing through a laminater 32 to yield a composite web 34. The web 34 passes through a series of gravure printing stations 36, 38 and 40, which print, in register, the various components of the printed matter applied to the layer 12. In register with the printed matter, but on the opposite face of the composite web 34 (the face which will ultimately be the inner face of the package material), a strip of seal material is applied at a station 42. The seal material, which can be seen in FIG. 1 and is designated by the reference numeral 44, is then subjected to drying, as at a station 46. Next, a web of material for the layer 16, a supply of which may be stored on a supply roll 48, may be laminated, as at 50, to the plies 12 and 14 to thereby complete the laminate 10.

Figure 4:
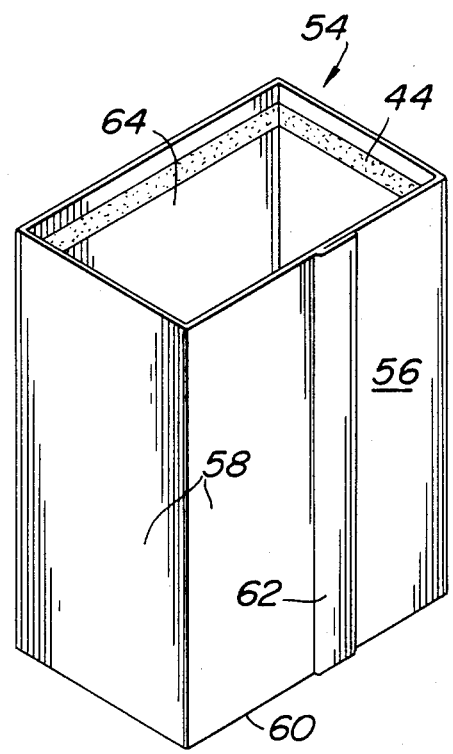
FIG. 4 is a perspective view of a bag for a package which employs the present invention.

Referring now to FIG. 4, there is seen a typical "stand-up" square-bottomed bag, designated generally by the reference numeral 54, employing the present invention. The bag 54 comprises a body member 56, made of the above-described materials, and having respective side walls 58 and a flat bottom wall 60. The bag 54, it will be understood, is made from laminate 10, 18 or other suitable material, by means of conventional folding, gusseting and heat sealing techniques. The seams of the bag 54, such as the seam 62 seen in FIG. 4, are preferably strong, permanent and welded. The seal material 44 is disposed around the periphery of the mouth 64, preferably having been deposited on the web as described above, during the printing operation (so as to insure that the seal material 44 is placed on the laminate 10, 18 in register with the printed matter).

Figure 5:
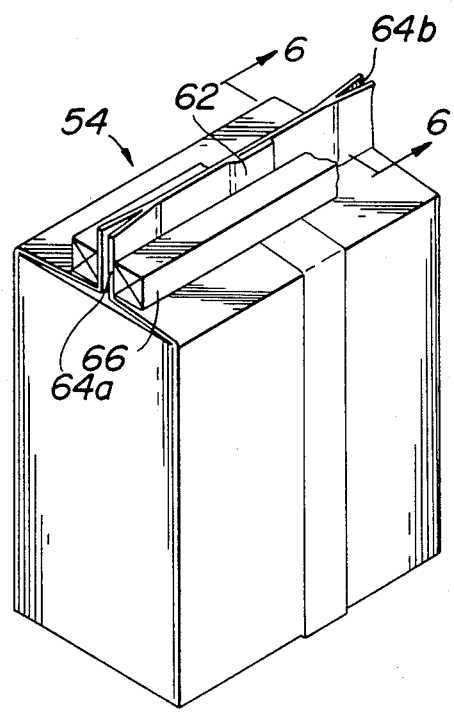
FIG. 5 is a perspective view of a package which employs the present invention.

Referring now to FIG. 5, there is shown, somewhat diagramatically, the manner in which the peelable seal in accordance with the present invention is made.

Figure 6:
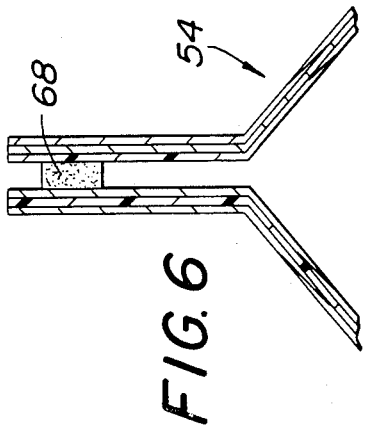
FIG. 6 is a cross-sectional view taken along the line 6—6 in FIG. 5.

The bag 54, after filling, may be passed along a production line to a point at which its mouth 64 comes adjacent a heat seal bar 66. The bar 66 applies to the area of the mouth 64 a pressure and temperature for the seal material 44, and for a suitable dwell time, so that the material 44 fuses completely to form a hermetic seal as illustrated in FIG. 6. Sealing in this manner is complete and hermetic despite the presence in the area of the mouth 64 of the above-mentioned gussets, designated in FIG. 5 by the reference numerals 64a and 64b. Vacuum may be applied to the bag 54 and its contents before sealing, and one particularly useful application of the present seal, it has been found, is to create reliable but easily opened vacuum packages from "soft" packaging materials.

The material for the seal 44, in the presently preferred form of the invention, consists of ethylene-vinyl acetate (EVA), with an additive of magnesium silicate. The proportions of the magnesium silicate additive, may be used to control the strength of the seal, thus enabling a packager to use constant settings of heat, pressure and dwell for the heat seal bar 66, while controlling the characteristics of the seal through variations in the composition of the seal material 44. The seal material 44 consists of about 10 to 20% by weight magnesium silicate, and the remainder ethylene-vinyl acetate, with a presently preferred composition of 15% magnesium silicate and 85% ethylene-vinyl acetate.

In one study, a sample of laminate was sealed to a like sample using a sealing material in accordance with the present invention. The test strips consisted of one inch wide 48 ga. thickness polyester, 60 ga. thickness PVA and 250 ga. thickness A-101 polyethylene on the sealing face. Using the pressure, dwell time and variable temperature set forth below, seal strengths (stated in grams per inch) were as follows:

| 40 psi, 6 sec., °F. | Seal strength g/in |
|---|---|
| 200 | 475 |
| 210 | 525 |
| 220 | 650 |
| 230 | 700 |
| 240 | 800 |
| 250 | 900 |
| 260 | 920 |
| 270 | 920 |
| 280 | 920 |
| 290 | 920 |
| 300 | 920 |
| 400 | 900 |
| 450 | 900 |

As will be seen from the above, as the temperature approached 250° F., the seal strength reached a fairly constant level of approximately 900 grams per inch, which held throughout the range of approximately 250° F. throught 450° F. In this regard, it will be observed in FIGS. 5 and 6 of the drawings that sealing takes place in the areas of the seam 62 and gussets 64a and 64b across four thicknesses of the package material (i.e. laminate 10 or 18), and in other areas of the mouth 64 across two thicknesses.

The above pressure, dwell time and temperature represent typical sealing conditions. Any of the conditions could be selectively changed to produce desired results.

Figure 7:
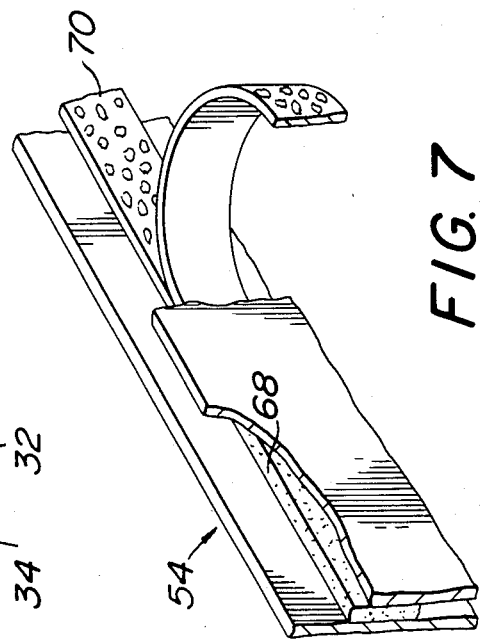
FIG. 7 is a detailed view, showing the manner in which the condition of a seal in accordance with the present invention may visually be ascertained.

FIG. 7 illustrates another attractive aspect of the present invention. When the seal material 44 is applied to the laminate 10, 18 and dried, it takes on a light cloudy color, which, upon observation, readily reveals the presence of the coating. The application of sealing heat causes the coating, upon sealing, to leave a clear (transparent) film in the area of the seal, as at 68 in FIG. 6. When the seal 68 is broken, either intentionally in the opening of the package or unintentionally through tempering or mishandling, the broken areas of the seal 68 take on a readily apparent chalky appearance, designated by the numeral 70 in FIG. 7. The appearance of the seal, therefore, provides a ready visual indicator of the integrity of the seal.

The present invention may be embodied in other specific forms without departing from its spirit or essential attributes, and, accordingly, reference should be made to the appended claims rather than the foregoing specification as indicating the scope of the invention.

I claim:

1. A package comprising a body member having side and bottom walls, said body member comprising a flexible laminate having a barrier ply and a sealable ply, said body member having a mouth portion and a hand-peelable seal for said mouth portion, said seal comprising a heat-fusible plastic polymeric coating so constructed and arranged as to have, when sealed, strength sufficient to retain vacuum within said package and to withstand stress attendant handling and shipping of said package, the strength of said seal being such that said seal may be broken by hand manipulation, and said side walls providing gusset portions for said mouth portion, said heat-fusible coating being applied to the inner surface of said body member at said mouth portion, said hand peelable seal encompassing said gusset portions as well as the other portions of said mouth portion.

2. A package in accordance with claim 1, wherein said seal has a strength of about 900-925 grams per inch.

3. A package in accordance with claim 2, wherein said coating, before sealing, has a cloudy appearance which renders said coating visible, the material of said coating being such that upon fusing of said coating said material becomes transparent, the transparency being indicative of the sealed area, and the material of said coating being such that upon opening of said seal the opened area of said seal assumes a chalky appearance so as to provide a visual indication that the seal has been opened.

4. A package in accordance with claim 1, wherein said heat-fusable coating is applied to the inner surface of said sealable ply adjacent to the perimeter of said mouth portion.

5. A package in accordance with claim 4, wherein said coating comprises a material which is of cloudy but translucent appearance when applied to said mouth portion, transparent when sealed, and of chalky appearance when the seal is opened.

6. A package in accordance with claim 4, wherein said coating comprises ethylene vinyl acetate and an additive of magnesium silicate.

7. A package in accordance with claim 6, wherein said coating comprises between about 10% to 20% magnesium silicate.

8. A package in accordance with claim 7, wherein said coating comprises about 15% magnesium silicate.

9. A package in accordance with claim 1, wherein said coating comprises between about 10% to 20% magnesium silicate.

10. A package in accordance with claim 9 wherein said coating comprises about 15% magnesium silicate.

11. A method of making a web of flexible material for packages of the kinds having a body member and a nonresealable peel seal, comprising the steps of providing a first web of material for forming a barrier ply for the body member, providing a second web of material for forming an interior sealing ply for the body member, laminating said first web to said second web, printing on one surface of said first web, laminating to said first web an exterior ply, and applying to the surface of said sealing ply opposite to the surface of the barrier ply to which said printing is applied material for forming a seal, said step of applying material for forming a seal being so performed as to position said material in register with the printing.

12. A method in accordance with claim 11, wherein said step of applying to the sealing ply material for forming a seal is performed by printing onto the sealing ply in register with the printing on the first web a strip consisting of ethylene vinyl acetate and between about 10% to 20% magnesium silicate.

* * * * *

UNITED STATES PATENT AND TRADEMARK OFFICE
CERTIFICATE OF CORRECTION

PATENT NO.  : 4,488,647
DATED       : December 18, 1984
INVENTOR(S) : John S. Davis It is certified that error appears in the above-identified patent and that said Letters Patent are hereby corrected as shown below:

Column 4, line 38, insert a decimal point (.) before "6", so that "6" reads --.6--.

Signed and Sealed this

Sixteenth Day of April 1985

[SEAL]

Attest:

DONALD J. QUIGG

Attesting Officer  Acting Commissioner of Patents and Trademarks